Sept. 19, 1944.    H. A. FLOGAUS    2,358,700
VEHICLE SPRING
Filed Feb. 19, 1943    2 Sheets-Sheet 1

INVENTOR
Howard A. Flogaus
BY
Donald U. Rist
ATTORNEY

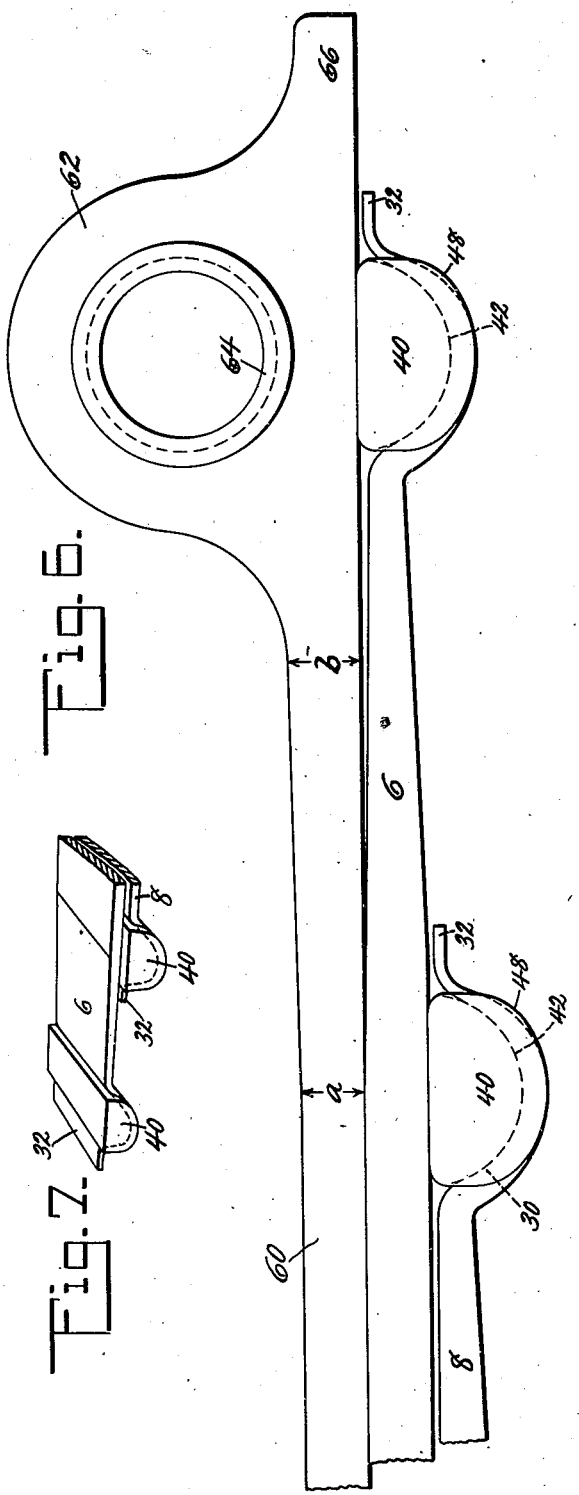
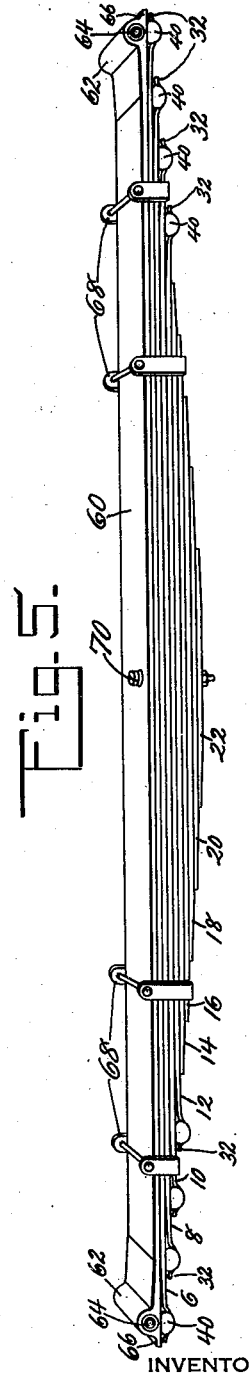

Patented Sept. 19, 1944

2,358,700

UNITED STATES PATENT OFFICE 2,358,700

VEHICLE SPRING

Howard A. Flogaus, Wallingford, Pa., assignor to The J. G. Brill Company, Philadelphia, Pa., a corporation of Pennsylvania Application February 19, 1943, Serial No. 476,426

4 Claims. (Cl. 267—50)

This invention relates to springs in general and in particular to leaf springs intended for use on vehicles running on either road or rail, and is in part a continuation of my earlier application Serial No. 451,697 filed July 21, 1942.

Numerous attempts have been made in the past to provide a completely satisfactory leaf spring but such attempts have failed to a greater or lesser degree. Any spring which is designed to be unlubricated, that is, have the leaves in direct metallic contact, is noisy and changes its characteristics as the metal becomes scored. On the other hand if a spring is designed for lubrication it soon becomes too stiff due to loss of lubricant and its ride characteristics are very bad. It is well known that it is practically impossible to maintain lubricant in vehicle springs due to the squeezing action of the spring leaves and due to the high velocity jets of water driven by the wheels against the springs. Attempts have been made to lubricate springs by inserts but these inserts could of necessity occupy but a small part of the spring leaf end hence they could not carry the load. Attempts have also been made to insulate the leaves of springs with flat pads having no lubricating function but such pads rapidly disintegrated due to the wedging action of the springs in service and due to the heavy loads, the point of application of which varied as the load on the spring varied. It is an object, therefore, of the present invention to provide a lubricating, insulating pad of sufficient strength to support the entire load transmitted from one spring leaf to the other.

A further object of the invention is the provision of a lubricating and insulating pad which can be readily inserted or removed from between the spring leaf ends.

A still further object of the invention is the provision of a lubricating pad carried by the spring leaf ends and which is self-equalizing to absorb the complete load over its entire area at all times.

A yet further object of the invention is the provision of an insert between spring leaves at the tips which will accomplish control over the spring friction thereby maintaining the ride characteristics of the spring substantially uniform.

Yet another object of the invention is the provision of a spring unit having a top leaf of special design and with the lubricating pads of the second leaf located beneath the eye portions of the first leaf.

These and other objects of the invention will be apparent to persons skilled in the art from a study of the following description and accompanying drawings, in which:

Fig. 5 is a perspective view of a slightly modified spring having a top leaf of modified form;

Fig. 6 is an enlarged detail view of an end of the spring shown in Fig. 5, and

Fig. 7 is an enlarged perspective view of the end portions of the spring unit with the top leaf removed.

Figure 1:
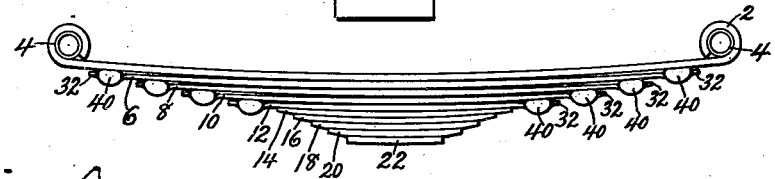
Figure 1 is an elevational view of a spring having the improvements applied thereto.

Referring now to the drawings in detail, it will be seen that the springs as shown in Figs. 1 and 5 are built up of a plurality of varying length leaves, the topmost of which in Fig. 1 has its ends rolled as at 2 around a bushing 4 thus forming an eye adapted to receive a pin, shackle or other means, by means of which the spring is attached to and supports the vehicle. The top leaf of the spring of Fig. 5 is of slightly different form and will be described later in detail. The remainder of the spring units are made up of a plurality of decreasing length leaves numbered 6, 8, 10, 12, 14, 16, 18, 20 and 22, respectively, from the top toward the bottom. Of these varying length leaves those numbered 14 to 22 inclusive are of more or less standard construction, while those numbered from 6 to 12 inclusive are modified to accommodate the improvement later to be described. It will, of course, be obvious that the improvement may be applied to more or less spring leaves than has been illustrated in Figs. 1 and 5.

Each of the spring leaves 6, 8, 10, 12 have their ends deformed by curving the metal outwardly and inwardly to provide a semi-cylindrical shape pocket 30. The metal forming the outer edge of this pocket or tip of the spring is bent outwardly as at 32 substantially parallel with the main portion of the spring. In this manner a strong semi-cylindrical pocket is formed extending completely across the spring unpierced by any holes and leaving the spring unweakened since there has been no stretching or extreme deformation of the metal forming the spring. This feature is important since the entire load carried by a spring is transmitted through the tips of the spring leaves.

Figure 4:
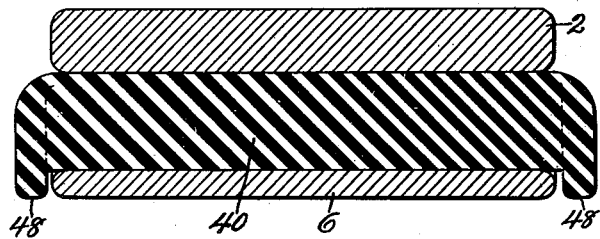
Fig. 4 is a sectional view taken substantially on line 4—4 of Fig. 2.
Figure 2:
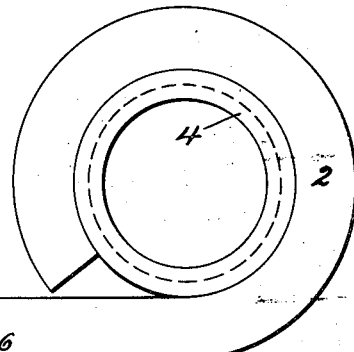
Fig. 2 is an enlarged detail view of an end of a spring with the improvement applied thereto.
Figure 3:
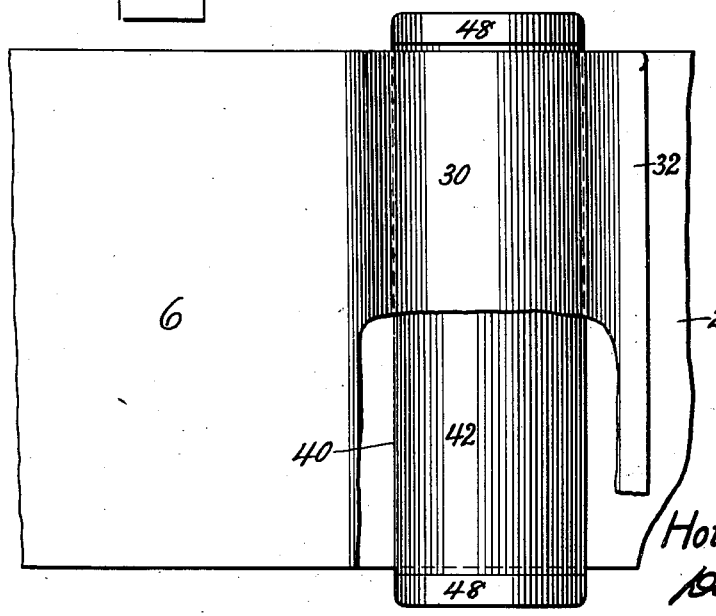
Fig. 3 is an inverted plan view of a portion of the spring with parts broken away to better disclose the lubricating and insulating means.

In order to separate the spring leaves 2 to 12 inclusive special insert units 40 are used. Each of these inserts is moulded or formed with a semi-cylindrical back portion 42 exactly conforming to the semi-cylindrical pocket 30 in the spring leaves. The face portion 44 is made substantially flat and adapted to engage the opposing surface of the adjacent spring. For ease in moulding or forming and to prevent abrasion, the corners adjoining the face and back are rounded as at 46. In this manner a semi-cylindrical bearing pad with wide engaging face, curved back and rounded corners is provided. This bearing pad, as clearly shown, particularly in Fig. 4, is provided with end flanges 48 extending outwardly from the back portion at the ends of the member and spaced sufficiently far apart to receive the spring leaf therebetween. In this manner the bearing unit is held against transverse shifting relative to the semi-cylindrical spring tip pocket. Each of the units is formed of sufficient thickness to hold the spring leaves apart slightly, and it has been found that a space of $\frac{1}{16}$ of an inch is sufficient to give a proper spring action for a long period of time. The units or inserts may be made of any suitable material but in practice it has been found that if they are made of dense layers of fabric bound together with a binder impregnated with graphite the best results are obtained. Graphite impregnated metal, rubber or other material could be used but in any case the insert is of sufficient strength as to carry the entire load while lubricating the entire bearing area subject to friction.

It will be seen that the bearing unit or insert may be readily inserted by merely prying the spring leaves apart sufficient to permit passage of the flanges 48, after which the unit may be slid transversely of the spring leaf until the flanges 48 drop over the sides of the semi-cylindrical pocket formed in the spring end. Removal of the wedging means will then permit the spring leaf to grip the insert and force the face 44 against the adjacent spring leaf. The flanges 48 will prevent any transverse shifting of the unit, while the semi-cylindrical pocket prevents removal of the unit along the spring. Due to the semi-cylindrical pocket and back of the bearing pad or insert, the pad or insert may adjust itself to various angular relations between the spring leaves such as arise when the spring is subjected to bearing loads, thus the entire bearing face 44 will be equally loaded and always in contact with the adjacent spring leaf and will slide on such leaf as a flat shoe. The graphite or other material in the unit will lubricate the steel surface, thereby preventing any squeaks, while the non-metallic composition of the unit will either eliminate or dampen transmission of noise from any cause through the spring to the vehicle body.

In the slightly modified form of Figs. 5 and 6 the top leaf 60 has the eye portions 62 formed integral therewith in any suitable manner, such as by forging, and these eyes receive the bushings 64 adapted to receive a pin, shackle or other means for supporting the vehicle. The remainder of the leaves are formed and positioned as previously described and are held together, as clearly shown in Fig. 5, by spaced binders 68 and a center bolt 70. As clearly shown in Figs. 5 and 6 the top leaf extends outwardly as at 66 beyond the eye portion thus continuing the flat lower surface past the eye and giving a good bearing surface for the insert 40 carried by the second leaf 6. As clearly shown, the second leaf 6 is of sufficient length so that its semi-cylindrical pocket is located beneath the eye portion of the first leaf 60, so that the semi-cylindrical insert may bear on the flat under surface of the first leaf below the eye of the first leaf. Under certain circumstances it may be desirable for the insert 40 of the second leaf to bear on the flat lower surface of the first leaf outwardly of the eye portion of the first leaf, that is, bear on the under part of extension 66. In any case and with the parts as shown, at least a part of the insert 40 of the second leaf 6 bears upon the under surface of the first leaf outwardly of the vertical plane through the axis of the eye. With the parts so related in an unloaded spring it is obvious that as the load increases and the spring leaves deflect, the pad 40 of the second leaf 6 will move farther toward the end 66 of the first leaf. Such a movement of the pad will tend to cause a counter-clockwise rotation of the first spring about the axis of the eye as viewed in Fig. 6. Since such an action tends to increase the load on the spring leaf inwardly of the eye, it is strengthened by having the metal increased, that is, the top leaf will throughout the greater part of its length have a uniform thickness $a$, while inwardly of the eyes the thickness will gradually increase toward the eyes as clearly shown and indicated at $b$ of Fig. 6. Such a strengthening takes care of the added loading in the zone inwardly of the eye caused by the loading of the first spring outwardly of the axis of the eye by the second spring. It will also be apparent that by extending the second leaf outwardly to a position substantially beneath the eye this leaf will act as a safety means preventing dropping of the vehicle in case the first leaf should break.

While the invention has been described more or less in detail, it will be obvious to persons skilled in the art that various modifications in the arrangement, construction and form of the parts may be made without departing from the scope of the invention as defined by the appended claims.

What is claimed is:

1. In a vehicle spring, a plurality of plates of spring metal each overlapped by an adjacent plate, one of said plates being formed with an integral eye inwardly of the ends thereof, semi-cylindrical pockets formed in the end portions of certain of said plates and open toward the surface of the overlapping plate, a bearing pad in each of said pockets and of sufficient thickness and length to hold apart the ends of the adjacent plates, the plate adjacent said one plate being of sufficient length as to locate its semi-cylindrical pockets and bearing pads beneath said eyes, said bearing pads being of semi-cylindrical form and rockable in said pockets whereby the flat portion thereof is maintained parallel to the adjacent surface of the adjacent plate.

2. In a vehicle spring, a first plate of spring metal having eyes formed adjacent the ends thereof and providing substantially flat areas beneath each eye, a second plate of spring metal overlapped by said first plate, semi-cylindrical pockets formed in and extending completely across the end portions of said second plate and open toward the adjacent surface of said first plate, and a bearing pad occupying each of said pockets and of sufficient thickness and strength as to hold apart the ends of said first and second plates, said bearing pad engaging said flat areas beneath each eye.

3. In a vehicle spring, a first plate of spring metal having eyes formed inwardly of the ends thereof, a second plate of spring metal overlapped by said first plate and of a length substantially equal to the length of said first plate, semi-cylindrical pockets formed in and extending completely across the end portions of said second plate substantially beneath the eyes of said first plate, said semi-cylindrical pockets being open toward the adjacent surface of said first plate, and a bearing pad occupying each of said pockets and contacting said first plate substantially beneath the eye thereof and of sufficient thickness and strength as to hold apart the ends of said first and second plates.

4. In a vehicle spring, a first plate of spring metal having eyes formed inwardly of the ends thereof, a second plate of spring metal overlapped by said first plate and of a length substantially equal to the length of said first plate, semi-cylindrical pockets formed in and extending completely across the end portions of said second plate substantially beneath the eyes of said first plate, said semi-cylindrical pockets being open toward the adjacent surface of said first plate, and a bearing pad occupying each of said pockets and contacting said first plate at least in part outwardly of the eyes thereof and of sufficient thickness and strength as to hold apart the ends of said first and second plates, said first plate being of increased thickness in the zones inwardly of the eyes thereby strengthening the plate in said zones in order that it may more readily resist the increased loading imposed by said bearing pads engaging said first plate outwardly of the center of said eyes.

HOWARD A. FLOGAUS.